United States Patent
Lillie et al.

(10) Patent No.: US 7,895,234 B2
(45) Date of Patent: Feb. 22, 2011

(54) SYSTEMS AND METHODS FOR SHARING PORTAL CONFIGURATIONS

(75) Inventors: David J. Lillie, Pewaukee, WI (US); Jayme C. Edwards, Mukwonago, WI (US); Brian Gilbert Riviere, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 591 days.

(21) Appl. No.: 10/667,750

(22) Filed: Sep. 22, 2003

(65) Prior Publication Data
US 2005/0065913 A1 Mar. 24, 2005

(51) Int. Cl.
G06F 7/00 (2006.01)
G06F 17/30 (2006.01)
G06F 7/04 (2006.01)
G06F 15/16 (2006.01)
H04L 29/06 (2006.01)

(52) U.S. Cl. .............. 707/784; 707/788; 707/786; 726/3

(58) Field of Classification Search .............. 709/201; 712/11; 707/5, 9, 10, 781–788, 999.009; 713/200, 201
See application file for complete search history.

(56) References Cited

U.S. PATENT DOCUMENTS

| 5,572,221 A | | 11/1996 | Marlevi et al. |
| 5,813,007 A | * | 9/1998 | Nielsen ............... 707/10 |
| 5,982,324 A | | 11/1999 | Watters et al. |
| 6,026,397 A | * | 2/2000 | Sheppard ............... 707/5 |
| 6,115,709 A | * | 9/2000 | Gilmour et al. ............ 707/9 |
| 6,202,066 B1 | * | 3/2001 | Barkley et al. ............. 707/785 |
| 6,636,894 B1 | | 10/2003 | Short et al. |
| 6,741,989 B1 | | 5/2004 | Seltzer et al. |
| 7,010,593 B2 | | 3/2006 | Raymond |
| 7,243,164 B2 | | 7/2007 | Vegge |
| 2001/0007133 A1 | * | 7/2001 | Moriconi et al. ............ 713/201 |
| 2001/0011341 A1 | * | 8/2001 | Hayes, Jr. et al. ............ 712/11 |
| 2002/0023158 A1 | * | 2/2002 | Polizzi et al. ............... 709/227 |

(Continued)

OTHER PUBLICATIONS

European Search Report, EP 04 02 2561, mailed Nov. 12, 2004.

(Continued)

*Primary Examiner*—Brent Stace
(74) *Attorney, Agent, or Firm*—Turocy & Watson LLP; William R. Walbrun; John M. Miller

(57) ABSTRACT

The present invention relates to systems and methods that provide a portal user with role-based access to components on a network via portlets within the portal. The role-based access can be sharable such that one or more users with a similar role can instantiate instances of a shared portal. Sharable configurations can be stored local to the user's portal, local to another portal and/or within a networked storage medium. The access provides a user with an entry-point to components, wherein a user can monitor and control components. The user can additionally configure the portal such that the component access is further based on the user's location. Advantages of the present invention include delineation of access and administrative functionality, the ability to combine web and application servers within a similar environment, and the ability to access (e.g., controlling, collecting and analyzing data, etc.) when the user is not utilizing the portal.

37 Claims, 14 Drawing Sheets

U.S. PATENT DOCUMENTS

| | | | |
|---|---|---|---|
| 2002/0038356 A1* | 3/2002 | Mager et al. | 709/217 |
| 2002/0059531 A1 | 5/2002 | Lai | |
| 2002/0067370 A1 | 6/2002 | Forney et al. | |
| 2002/0087525 A1* | 7/2002 | Abbott et al. | 707/3 |
| 2002/0112186 A1 | 8/2002 | Ford et al. | |
| 2002/0144142 A1* | 10/2002 | Shohat | 713/200 |
| 2002/0158899 A1* | 10/2002 | Raymond | 345/736 |
| 2002/0161875 A1 | 10/2002 | Raymond | |
| 2002/0174333 A1 | 11/2002 | Harrah et al. | |
| 2002/0194226 A1 | 12/2002 | Sheth et al. | |
| 2003/0105974 A1 | 6/2003 | Griffin et al. | |
| 2003/0115322 A1* | 6/2003 | Moriconi et al. | 709/224 |
| 2003/0117437 A1* | 6/2003 | Cook et al. | 345/764 |
| 2003/0131110 A1 | 7/2003 | Chang et al. | |
| 2003/0163513 A1* | 8/2003 | Schaeck et al. | 709/201 |
| 2003/0191650 A1 | 10/2003 | Turner et al. | |
| 2004/0017977 A1 | 1/2004 | Lam et al. | |
| 2004/0019799 A1* | 1/2004 | Vering et al. | 713/200 |
| 2004/0034799 A1* | 2/2004 | Mikami | 713/201 |
| 2004/0078787 A1 | 4/2004 | Borek et al. | |

OTHER PUBLICATIONS

Dongwan Shit, Gail-Joon Ahn, Sangrae Cho and Seunghun Jin, "A Role Administration System in a Role-Based Authorization Infrastructures—Design and Implementation", 2003, 5 pages.

Andreas Schaad, Jonathan Moffett and Jeremy Jacob, "The Role-Based Access Control System of a European Bank: A Case Study and Discussion", 2001, 7 pages.

Sylvia Osborn and Ravi Sandhu, "Configuring Role-Based Access Control to Enforce Mandatory and Discretoinary Access Control Policies", May 2000, pp. 85-106.

Halo Roeckle, Gerhard Schimpf and Rupert Weidinger, "Precess-Oriented Approach for Role-Finding to Implement Role-Based Security Administration in a Large Industrial Organization", 2000, 8 pages.

OA dated Dec. 16, 2009 for U.S. Appl. No. 10/667,743, 14 pages.
OA Dated Aug. 18, 2008 for U.S. Appl. No. 10/667,749, 25 pages.
OA Dated Nov. 25, 2008 for U.S. Appl. No. 10/667,704, 20 pages.
OA Dated Nov. 26, 2008 for U.S. Appl. No. 10/667,743, 17 pages.
OA Dated Jan. 8, 2009 for U.S. Appl. No. 10/667,749, 21 pages.
OA dated Apr. 20, 2009 for U.S. Appl. No. 10/667,749, 20 pages.
OA dated May 28, 2009 for U.S. Appl. No. 10/667,704, 15 pages.
OA dated Jun. 8, 2009 for U.S. Appl. No. 10/667,743, 16 pages.
OA dated Nov. 12, 2009 for U.S. Appl. No. 10/667,749, 26 pages.
OA dated Sep. 14, 2009 for U.S. Appl. No. 10/667,704, 14 pages.
OA dated Apr. 7, 2010 for U.S. Appl. No. 10/667,704, 17 pages.
OA dated Jun. 3, 2010 for U.S. Appl. No. 10/667,743, 13 pages.

\* cited by examiner

SYSTEMS AND METHODS FOR SHARING PORTAL CONFIGURATIONS

CROSS-REFERENCE TO RELATED APPLICATIONS

This application is related to pending U.S. patent applications Ser. No. 10/667,749 entitled "SYSTEMS AND METHODS THAT PROVIDE ROLE-BASED ACCESS TO COMPONENTS THROUGH A CONFIGURABLE INTERFACE" filed on Sep. 22, 2003; Ser. No. 10/667,704 entitled "SYSTEMS AND METHODS THAT DELEGATE ROLES/ACCESS VIA LOCATION" filed on Sep. 22, 2003; and Ser. No. 10/667,743 entitled "SYSTEMS AND METHODS THAT PROVIDE ROLE-BASED ACCESS DIAGNOSTICS AND PROGNOSTICS" filed on Sep. 22, 2003.

TECHNICAL FIELD

The present invention generally relates to industrial control systems, and more particularly to systems and methods that employ a configurable user interface to provide sharable role-based access to industrial systems.

BACKGROUND OF THE INVENTION

A typical network comprises a plurality of interconnected microprocessor-based devices with specialized (e.g., network) software and/or hardware that facilitates interaction between at least two of the devices on the network. Such interaction can provide for a fast, efficient and cost-effective means to monitor, control and/or exchange information amongst networked devices. In many instances, peripheral devices such as printers, plotters and terminals are coupled to the network or locally to other devices on the network to enhance the usability of information. For example, data can be output to paper as a graph(s), a table(s), a chart(s), and the like. The foregoing benefits associated with a network can be exploited in industrial settings to improve control and monitoring of industrial devices and systems of devices.

A typical industrial device comprises a plurality of modules (e.g., a programmable logic controller, or PLC) such as a control module(s), an interface module(s) and an I/O module(s) utilized in connection with electrical, mechanical, hydraulic and pneumatic systems and processes. Control commonly is achieved via virtual relays, contactors, counters, timers and other means through hardware, software and/or firmware that can be user (e.g., user written, application specific code) configured. I/O provides a mechanism for communication between systems and the environment. For example, an input channel can be employed to receive analog and digital signals through sensors, switches and the like that provide information indicative of state(s) (e.g., on/off) and/or relating to a process(s). An output channel can be employed to convey a next state to an instrument under the control of the controller. Such industrial devices have enabled modem factories to become semi and/or fully automated.

Although conventional networks can be employed in an industrial environment to network industrial devices, typical network architectures are designed for data retrieval and storage and application execution via computers on the network, rather than for industrial device control and monitoring. Thus, in many instances, conventional networks do not provide the flexibility, security, functionality, robustness and/or user friendliness desired in the industrial environment.

In addition, conventional networks typically are structured to be setup and maintained by an IT administrator, wherein the IT administrator establishes accounts, defines groups, configures security, mitigates down time (e.g., monitoring and maintaining memory leaks the can lead to network crashes) and sets up individual computers for network access. The IT administrator commonly defines base functionality via a default setup, wherein users are limited to personalizing colors, themes and icons, and configuration provides coarse delineation, for example, user access merely defined at the division or department level.

Such constraints can be a bottleneck within the industrial environment. For example, an operator such as an electrician, technician or tester can be delayed from commencing and/or completing a task while waiting for the IT administrator to provide suitable privileges, generate accounts and/or troubleshoot problems. Such delays can stall parameter and variable adjustments, postpone process optimization and even shut down production, for example, which can lead to extraneous costs, diminished output and resource consumption. Thus, there is a need to provide more flexibility and tunable interaction with industrial devices interfaced on a network.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to systems and methods that provide a user with access to components in an industrial environment based on a "who, what, where" approach. For example, access can be based on the user's name, role and location. Portal configurations can be generated to provide default and customized portals for respective users. The configurations can be stored local to a portal and/or on other networked components such as within common and local storage areas, wherein the configurations can be shared amongst users with similar roles. For example, more than one instance of a configuration can be concurrently instantiated in connection with different portal by users with a similar role. In addition, user location can be dynamically employed to enhance the user's experience by updating (e.g., real-time) access as the user traverses the plant.

A model can be constructed that defines roles and assigns resources (e.g., users) to the roles. The granularity of the model can be as coarse or fine as desired, and the model can be employed with an entryway, such as a portal to a network, wherein a user can access components on the network, via portlets within the portal. Various levels within the model can provide users with selective access and administrative privileges to improve resources utilization efficiency and system performance. The systems and methods of the present invention can be employed in connection with diagnostics and/or prognostics in order to facilitate analyzing components, automatically or manually (with human assistance) adjusting components, and/or providing forecasts.

Conventional network techniques typically classify a user at a group or workgroup level, wherein a generic network administrative account is generated and utilized at the top-level to manage and maintain the network. Such crude delineation may be not be sufficient or optimal, and may even introduce security issues, within the division's network since users with administrative privileges share privileges. Typically, an IT group retains administrative privileges, wherein users contact the IT group for network and/or component related issues, which can introduce delays due to lack of particular knowledge with the components associated with a user, proximity between the IT group and the users, insufficient IT personnel and/or IT availability.

Other advantages of the present invention include the ability to combine web and application servers within a similar environment and continue accessing components when the user is not actively utilizing a portal. Thus, a user can continue to collect, analyze and employ data to generate reports such as trending charts, graphs and tables when the user is not utilizing the portal.

In one aspect of the present invention, a system and methods are provided that enable a user to share portal profiles with other users with similar roles. The system comprises a user interface that can be coupled to a network to access other components on the network. The user interface can retrieve the shared profile from a bank of profiles, wherein the bank can include default profiles and custom profiles. Respective stored profiles typically are associated with a read/write/execute attributes, for example, such that selective operators can be provided with profiles related to the operator's roles. The methods provide for selecting a sharable configuration to load and/or customizing a configuration and storing it as a shared configuration such that other users can employ it.

In another aspect of the present invention, a system is depicted that provides selective access to a component(s) on a network. The access granted to a particular user typically comprises a subset of the networked components and/or a subset of capabilities, and is based on criteria such as user role, name, identification, job description, seniority, security, knowledge base, project, group, team and/or responsibility. The system can be designed for more than one user (including all users) within an organization by granting users selective access to components via a configuration(s) tailored to the user(s). Tailored configurations allow access and/or administrative privileges to be delineated and shared by various users, with various roles, at various levels of the organization. In addition, any or all users can be provided with the ability to generate configurations and associate configurations with users.

In another aspect of the present invention, an exemplary user interface (e.g. portal) that can be employed in accordance with an aspect of the present invention is illustrated. The user interface includes various sub-regions, with a primary region, that can be associated with components within a user's scope to allow the user to access such components. The primary and/or sub-regions can comprise known input/output mechanism such as a graphical user interface (GUI) and command line interface. As such, the user interface can be an application and/or portion of an application executing in connection with one or more microprocessor-based devices, including various software, hardware and firmware. For example, the regions can be based on a web browser.

In yet another aspect of the present invention, portals can be generated via common application programmer interface (API), wherein portal and/or portal configuration developers can focus of the needs of a hierarchical role. GUIs (e.g., via the .NET framework) and SDK programming packages can be employed to facilitate development by providing a simple means to provide content information to generate portals and/or portal configurations.

In still another aspect of the present invention, systems are depicted for utilizing role-based configurations in connection with a portal. In one instance, a role-based access bank is utilized to obtain a configuration for a user. The configuration can be a default, a custom or another user's configuration. In addition, the current configuration can be dynamically updated, for example, as the user's access changes and/or the portal's location changes. In another instance, a user can load and/or modify a configuration within the scope of the user's role. A role-identifying component can facilitate determining and/or extracting the user's role, and subsequently utilizing the user's role to provide the user with associated configurations, wherein the user can select to load one or more of such configurations. In yet another instance, a user can create a configuration, based on the scope of the user's role. A filter can be employed to obtain the user's role and subsequently extract the components associated with the user from all components. The extracted components can be further narrowed utilizing user criteria via the filter.

In other aspects of the present invention, methodologies are employed that provide a user with selective access to components on the network based on criteria similar to that utilized in connection with the above-noted systems. In addition, exemplary hierarchical architectures are provided to illustrate how role can be delineated throughout an organization. Furthermore, various portlet shapes are depicted and described, and exemplary environments in which the subject invention can be employed are provided.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
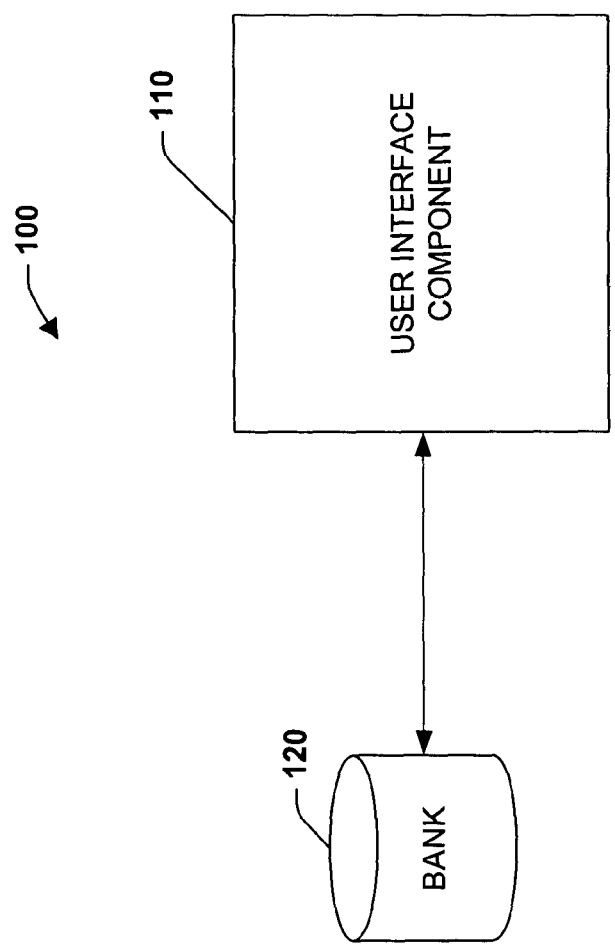
FIG. 1 illustrates an exemplary system that utilizes a shared user interface configuration to access networked components, in accordance with an aspect of the present invention.

The present invention relates to systems and methods that provide a sharable portal configuration, wherein users can employ the configuration to gain selective access to components in an industrial environment. Generally, the user employs the portal with a plurality of portlets, wherein respective portlets provide windows of selective access to one or more components within the scope of the user. For example, an electrician utilizing a portal of the present invention can customize the portal via adding portlets and associating components with the portlets. Typically, the electrician selects components from a group (subset) of components related to the electrician's functional role. Sharable configurations can be stored local to the user's portal, local to another portal and/or within a networked storage medium. Typically, users with similar roles can instantiate instances of a portal configuration associated with the role. The configuration commonly invokes instantiation of a portal with a plurality of portlets, wherein respective portlets provide windows of selective access to one or more components within the scope of the user. The user can additionally configure the portal such that the components accessed via portlets are based on the user's location. Thus, the present invention utilizes a "who, what, where" approach to determine the components a user can access and the components the user accesses at any given instance in time.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 for sharing profiles amongst user interfaces, in accordance with an aspect of the present invention. The system 100 comprises a user interface component ("UI") 110 that can be coupled to a network and employed to access other components on the network. For example, UI 110 can be employed to monitor and/or control another component(s), in addition to providing conventional and known capabilities such as file sharing, network software execution (e.g., word processors and the like), communication (e.g., text messaging, chat rooms, email, etc.), archiving and information gathering (e.g., querying over the Internet). System 100 further comprises a bank 120, wherein profiles can be stored and shared.

UI 110 and/or any similar UI (e.g., as described in detail below) can retrieve and/or store one or more profiles (e.g., a configuration, settings, preference and property file) in bank 120. In one aspect of the present invention, default profiles can be predetermined and stored in bank 120. For example, a developer or user can generate basic profiles and upload the profiles to bank 120. The profiles can be associated with various read/write/execute attributes such that selective operators are provided with different profile access. In another example, an operator with a subset of administrative privileges (e.g., a manager, technical lead and the like) can create and store basic profiles. Likewise, attributes can be associated with the profiles for selective access. In general, the profiles available to a respective user are associated with the user, for example, via the user's functional role, name, identification, job description, seniority, security, knowledge base, project, group, team and/or responsibility. Any number of user's can be provided with the ability to generate, store and utilize profiles from the bank 120.

In one aspect of the present invention, a user of UI 110 can create a new profile(s). For example, rather than retrieve a default profile from bank 120, the user can employ a utility, or tool to generate a new profile. In one example, the utility is a graphical user interface, which walks the operator through profile generation. In another aspect of the present invention, an API can be employed to facilitate generating a new profile. In yet another aspect of the present invention, a profile can be created via a command line interface, wherein scripts, function calls and/or values, for example, can be entered. New profiles generated via UI 110 can be utilized in connection with UI 110 and/or stored to bank 120. Profiles stored in bank 120 can be retrieved and utilized by other users employing UI 110, other user employing a different UI and/or the same user utilizing a different UI. In many instances, the profile can be concurrently utilized. For example, one or more users can load a similar configuration to a respective UI, wherein the profile can be utilized by any number of UIs at any given time. In addition, a respective user can log on to several UIs and employ the same and/or different profile on respective UIs.

User generated profiles can be dynamically modified or removed from bank 120. In many instances, when a shared profile is modified, the modification can be propagated to the UIs utilizing the profile. In one example, a polling mechanism can be employed that periodically polls UIs and updates, or refreshes the UI if the profile changed. In another example, the user can be notified via a pop message, tone, etc. that the profile has changed, and the user can determine whether to refresh the profile, create a temporary copy of the loaded profile such that changes are not reflected, save the loaded profile under a different name such that the changes are not reflected or change profiles, for example.

UI 110 can additionally employ a mechanism to search for profiles. For example, the search routine can locate all profiles available to the user and/or a subset thereof and return a list to the user from which the user can select one or more profiles. It is to be appreciated that the set of all profiles available to the user can be a subset of the existing profiles. For example, the profiles available to any user can be based on the user's location, position, time of day, day of week, tasks completed, current tasks and future tasks, for example, which can be a subset of all existing profiles. After retrieving the list, the user can select one or more profiles. For example, the user can load several profiles and define criteria, which determine the current profile employed. For example, the active profile can be based on predetermine criteria.

In another example, intelligent based decisions can determine a profile. Such decisions can be based in part on statistics, probabilities, inferences and classifiers (e.g., explicitly and implicitly trained). For example, techniques such as Bayesian learning methods that perform analysis over alternative dependent structures and apply a score, Bayesian classifiers and other statistical classifiers, including decision tree learning methods, support vector machines, linear and non-linear regression and/or neural network representation.

Figure 2:
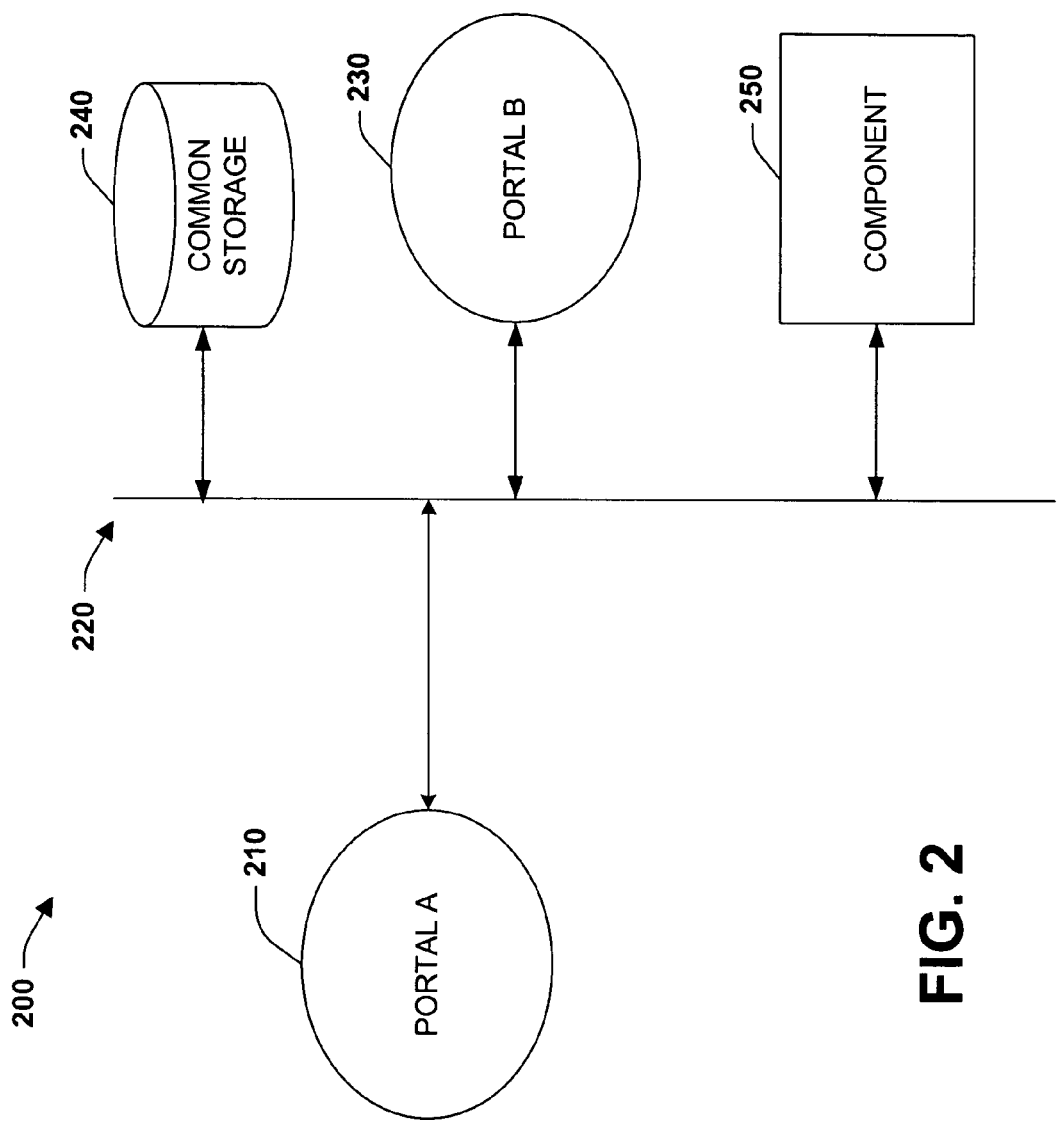
FIG. 2 illustrates an exemplary for sharing portal configurations, in accordance with an aspect of the present invention.

FIG. 2 illustrates a system 200, wherein one or more portals can interface to a network and share a configuration, in accordance with an aspect of the present invention. The system 200 comprises a portal A 210 coupled to a network 220, wherein the portal A 210 can provide access, via one or more portlets, to a portal B 230, a common storage component 240, and/or a component 250. Access provided to a user by portal 210 can include controlling, viewing, monitoring, analyzing, manipulating (e.g., adding, changing and removing), initializing, executing, exchanging and recording information related to a component, wherein information can include parameters, variables, results, reports, tasks, instructions, simulations, documentation, configuration, settings, files and animations.

Portal A 210 and portal B 230 can employ various configurations, which determine the access provided to a user. The configurations can be stored locally to the portals and/or within common storage 240. Local and common storage 240 can include RAM, hard disk, tape, CD, DVD, and the like. Typically, the configuration employed is associated with the user, for example, associated with the user's role. However, as noted previously, various other criteria can be employed to obtain a configuration for the user. Custom portal configurations stored locally and/or within the common storage 240 can be hidden or sharable. Hidden configurations cannot be seen by others users, including users with a similar role. Other users with a similar role can employ the sharable configurations.

By way of example, a configuration can be generated and associated with settings that define whether or not another operator and/or portal can utilize (including concurrently) the configuration. In one aspect of the present invention, the settings can include a field(s) that defines the role(s), or job function(s) that can utilize the configuration. For example, the field can be utilized to set a flag indicating that all operators of class "X" can access and utilize the configuration. When an operator of class "X" logs on to a portal, the operator can then load and utilize any configuration associated with class "X." If the operator is of a different class, then the configuration for class "X" can be hidden, or unavailable to the operator. It is to be appreciated that a configuration and/or an operator can be associated with more than one class. Thus, an operator can select a configuration from one or more sets of configurations.

It is to be appreciated that more than one user can log on to portal A 210. For example, portal A 210 can provide a mechanism to toggle through various log on sessions such that two or more operators can be concurrently logged on and/or an operator can log on to more than one account. Such flexibility can enable a manager to log on under an administrative account to observe and/or modify operator accounts, as well as log on to an account that will provide access to monitor and/or control a network component of interest. The manager can than switch between the accounts without having to log out and log in. In addition, two different users can log on and employ a shared configuration. In another aspect of the present invention, the portal A 210 can be partitioned such that two or more accounts can be logged into and concurrently displayed, if desired.

It is noted that component 250, as well as any other component as utilized herein, can be hardware, software (e.g., executing) and/or firmware based. For example, a component can be a computer (or derivatives thereof), a client, a server, a database, a printer, a network, a microprocessor-based system, device, process or equipment, an industrial controller, a human machine interfaces, a process running on a processor, a processor, an object, an executable instruction, a thread of execution, and/or a program. In addition, a component can be localized within an individual entity and/or distributed across two or more entities. Moreover, common storage 240 and portal B can be referred to as components.

Figure 3:
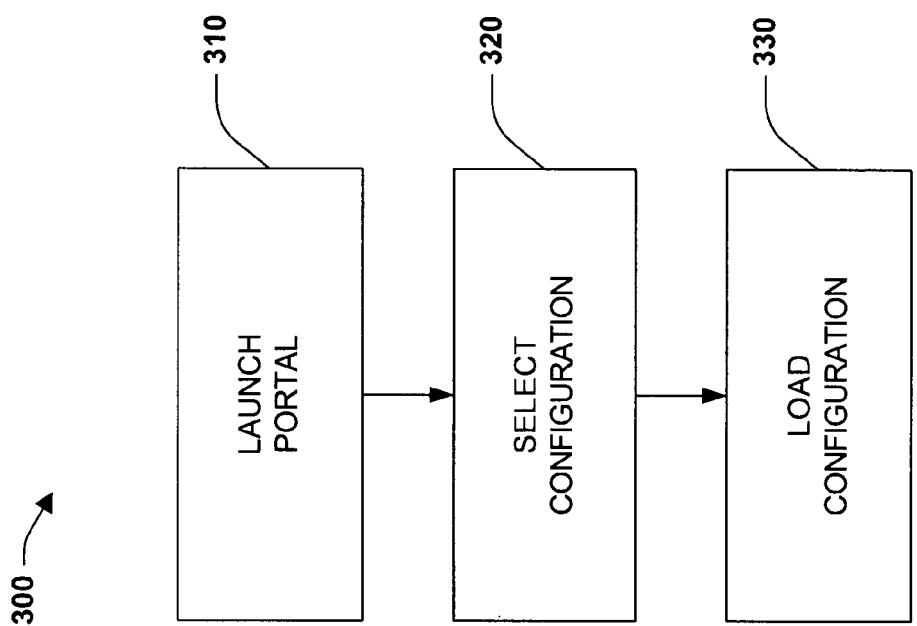
FIG. 3 illustrates an exemplary methodology for employing a shared portal access configuration, in accordance with an aspect-of the present invention.
Figure 4:
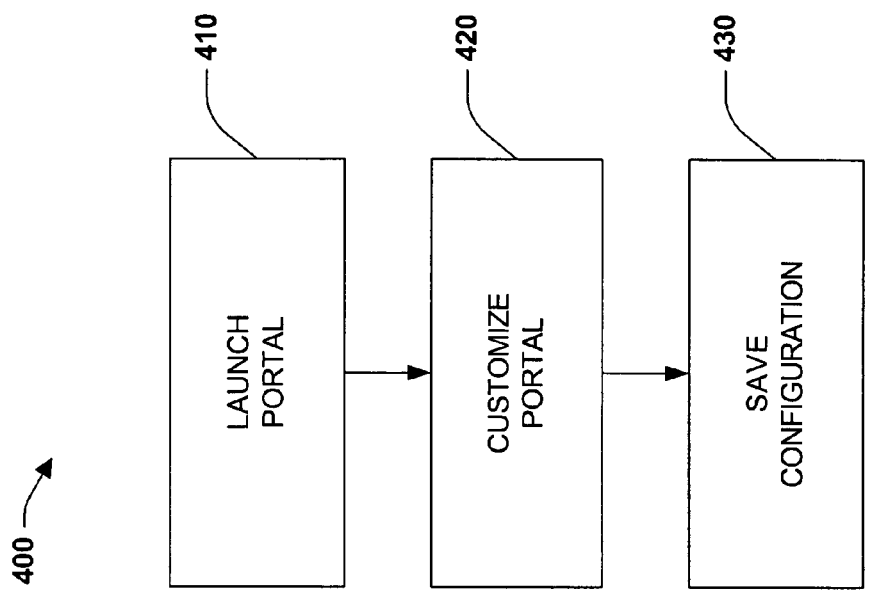
FIG. 4 illustrates an exemplary methodology for creating shared portal configurations, in accordance with an aspect of the present invention.

FIGS. 3 and 4 illustrate methodologies in accordance with an aspect the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding FIG. 3, a methodology 300 is illustrated to load a sharable portal configuration, in accordance with an aspect of the present invention. At reference numeral 310, a user launches a portal. In one aspect of the present invention, the portal 310 can be an application(s) or a portion of an application executing in connection with one ore more microprocessor-based devices, such as a laptop, notepad, personal computer (e.g., desktop, mini-tower and tower), palm pilot, handheld, personal data assistant, mainframe, cell phone, terminal (e.g., "dumb" terminal), tablet pc, HMI, and the like. The portal can automatically invoke a default or predetermined configuration, based on the user's role or the user can determine not to automatically load any configuration.

At reference numeral 320, the user can select a portal configuration to load. For example, the user can obtain a configuration from local memory, a common storage area on the network or from the local memory of another portal. Typically, the user will only be able to select configurations that are associated with the user's role. However, under some circumstances, a user can be provided with the option to select a configuration from a user with a different role. The configuration selected can be a default, user customized or other user customized. In addition, the configuration can be saved as a sharable configuration, wherein multiple portals can instantiate instances of the configuration. It is to be appreciated that the intelligent techniques describe above can be employed to facilitated selecting and loading the configuration.

At reference numeral 330, the selected configuration and loaded and employed. It is to be appreciated that a change to a configuration being shared (utilized) can be reflected in one or more of the other instances. For example, a user can determine that the portal should be updated, or refreshed with the modified configuration when the configuration is saved. In another example, the user can be prompted, wherein the user can manually determine when the configuration is updated.

Referring now to FIG. 4, a methodology 400 is illustrated to customize a portal configuration and share the configuration with other portal users, in accordance with an aspect of the present invention. At reference numeral 410, a user launches a portal. The portal can automatically invoke a default or predetermined configuration, based on the user's role or the user can determine not to automatically load any configuration. In addition, the user can determine to create a new configuration or customized a saved configuration.

At reference numeral 420, the user can customize the portal configuration. For example, the user can determine a desired look and feel (e.g., grey scale (including black/white), color, resolution, contrast, buttons, controls, functionality, etc.) based on the user's scope of employment. In addition, the user can add portlets and associate components with the portlets. Techniques such as drag and drop can be employed to move components from a list of available components to a respective portlet. Furthermore, the user can set the size, position and/or shape of one or more of the portlets. Moreover, customization can be automatically determined for a user via an intelligent technique (e.g., as describe above). The user can review the customization and accept the configuration, modify the configuration or discard the configuration.

At 430, the customized configuration can be saved to local memory and/or a common storage area on the network. The saved configuration can be associated with an attribute rendering the configuration sharable with other users, such as users with a similar role. In one aspect of the present invention, the user can provide another user with a different role the ability to share the configuration. Respective instances of the saved configuration can be employed within multiple portals.

Figure 5:
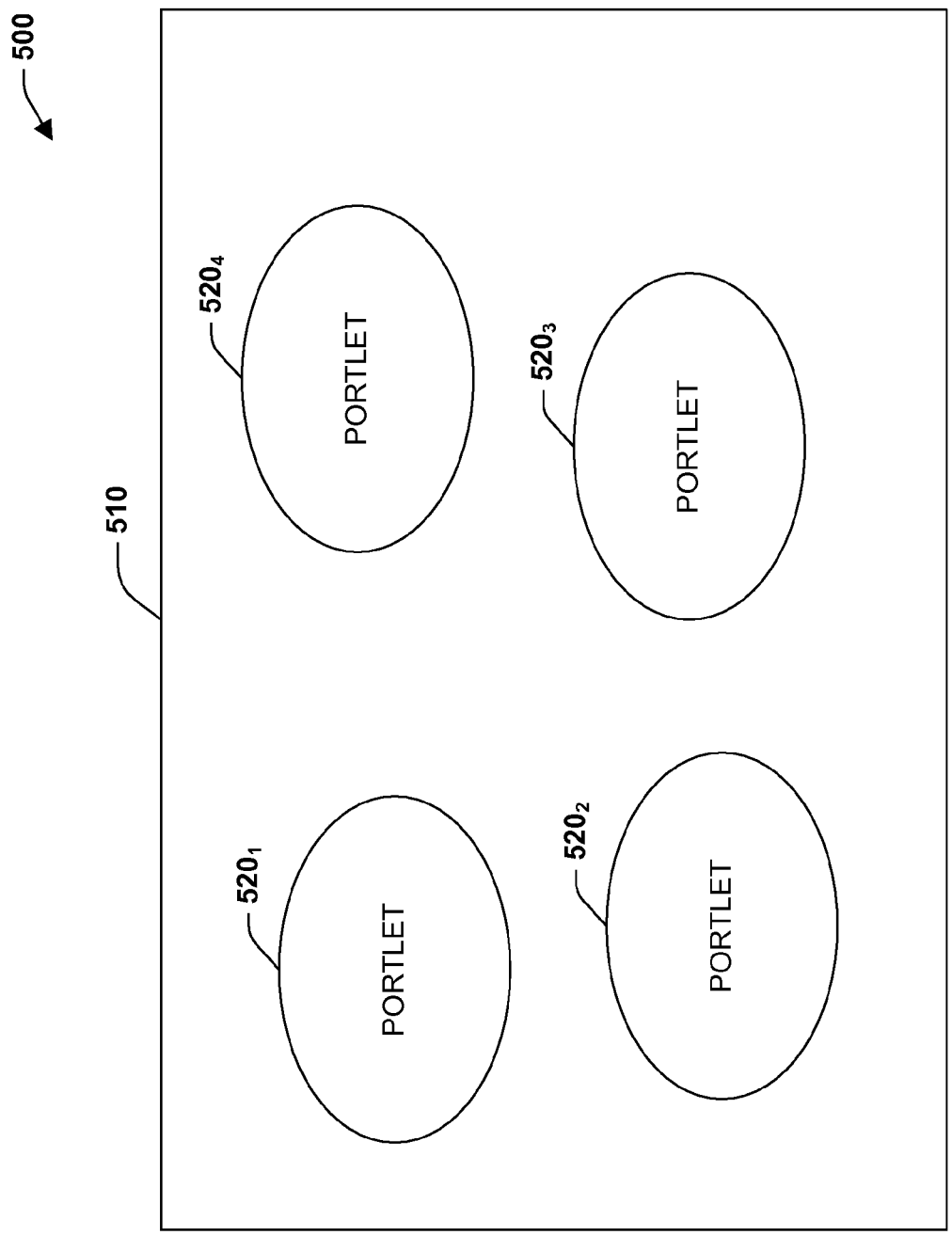
FIG. 5 illustrates an exemplary portal, in accordance with an aspect of the present invention.

FIG. 5 illustrates an exemplary system 500 that facilitates interaction with components on a network, in accordance with an aspect of the present invention. In general, a user can employ system 500 to observe and effectuate a networked component(s). The system 500 comprises a portal 510 with a plurality of portlets $520_1$-$520_4$. Respective portlets $520_1$-$520_4$ reside within portal 510, and can be generated and associated with networked components (not shown). It is to be appreciated that four portlets are provided for explanatory purposes, and that more or less portlets can be employed in accordance with an aspect of the present invention.

In one aspect of the present invention, the portal 510 can be an application(s) or a portion of an application executing in connection with one ore more microprocessor-based devices, such as a laptop, notepad, personal computer (e.g., desktop, mini-tower and tower), palm pilot, handheld, personal data assistant, mainframe, cell phone, terminal (e.g., "dumb" terminal), tablet pc, HMI, and the like. For example, in one aspect of the invention, portal 210 can be executable code running on one or more of the foregoing microprocessor-based components, wherein the code can reside in local memory such as any suitable type of RAM or ROM, virtual memory, hard disk, etc. and/or an external storage such as CD, DVD, optical disk, floppy disk, tape, memory stick, portable hard drive, etc. In addition, off-the-shelf and/or specialized (e.g., proprietary) hardware such as accelerators, dedicated processing chips and high-speed communication channels can be employed in connection with portal 510 to increase performance, enhance user capabilities, increase transmission and rendering rates and improve aesthetics. Furthermore, firmware can be utilized to provide low-level executable instructions, parameters and/or control code, and provide a flexible means to upgrade and/or revision hardware functionality and performance.

Portal 510 can be based on a browser such as a web browser. As such, portal 510 can comprise mechanisms (e.g., input and output) that facilitate communication and/or interaction over a network. For example, portal 510 can comprise text and/or graphic presenting (e.g., output) regions comprising dialogue boxes, static controls, drop-down-menus, list boxes, pop-up menus, and graphic boxes. The presenting regions can further include utilities to facilitate display. For example, the presenting regions can include vertical and/or horizontal scroll bars to facilitate navigation and toolbar buttons to determine whether a region will be viewable, to adjust zoom, orientation and color/gray scale. A user can interact with the presenting regions to view, select and provide information via various devices such as a mouse, a roller ball, a keypad, a keyboard, a pen and/or voice activation, for example.

Input regions utilized to transmit information can employ similar mechanism (e.g., dialogue boxes, etc.), and, in addition, utilities such as edit controls, combo boxes, radio buttons, check boxes and push buttons, wherein the user can employ various input devices (e.g., the mouse, the roller ball, the keypad, the keyboard, the pen and/or voice activation) in connection with the mechanism and utilities. For example, the user can provide a parameter or variable, or pointer thereto (e.g., a register location) via entering the information into an edit control box and/or highlighting an associated check box. Typically, a mechanism such as a push button is employed subsequent entering the information in order to initiate conveyance of the information. However, it is to be appreciated that the invention is not so limited. For example, merely highlighting the check box can initiate information conveyance.

The input and output mechanisms can be employed for various communication such as email, chat room, instant messaging, etc. In addition, URLs and/or hyperlinks can be utilized to locate and/or specify locations of information. Help files, debuggers, troubleshooting documentation and/or automatic event (e.g., error) loggers can be linked for manual and/or automatic invocation. Applications such as word processors, data analysis, scheduling utilities, project planners, etc. can be launched from drop-down menus, short-cuts and/or buttons.

In addition or alternatively, portal 510 can include command-line functionality. For example, a command line can be employed to prompt for information via a text message and/or audio tone. The operator can than provide suitable information, such as alpha-numeric input corresponding to an option provided in the interface prompt or an answer to a question posed in the prompt. In another aspect of the present invention, a value, set of values or a stream of values can be presented to the user in the command line interface.

The portlets $520_1$-$520_4$ within portal 510 can be configurable such that a user can add (e.g., drag and drop), remove and/or customize them within portal 510. For example, the user can add a portlets and associate the sub-region with one or more network components in order to access (e.g., as described above) the component. In addition, the user can variously arrange the portlets $520_1$-$520_4$ within portal 510. For example, the user can set the size, position and/or shape of one or more of the portlets $520_1$-$520_4$.

It is to be appreciated that the portlets $520_1$-$520_4$ can overlap, be activated or deactivated, and/or be displayed as a field, code, graphic or icon rather than as viewable information until the operator desires to view the information. Portlets $520_1$-$520_4$ can be manually activated, deactivated and removed via the operator and/or automatically based on predefined criteria. For example, criteria can be defined such that a portlet is activated and brought to the front of portal 510 when a particular event (e.g., startup, shutdown, halted (e.g., during an error condition) and entering/exiting a zone) occurs. Similarly, portlets $520_1$-$520_4$ can be de-activated and minimized and/or removed based on events such as the conclusion of a process, an error condition is resolved and/or exiting a zone.

Like portal 510, portlets $520_1$-$520_4$ can comprise input and output functionality. For example, mechanisms that can be employed with a sub-region include a mouse, a roller ball, a keypad, a keyboard, a pen and/or voice activation, wherein such mechanisms can be utilized with edit controls, combo boxes, radio buttons, check boxes and push buttons. In addition, portlets $520_1$-$520_4$ can include text and/or graphic presenting regions comprising dialogue boxes, static controls, drop-down-menus, list boxes, pop-up menus and graphic boxes, with vertical/horizontal scroll bars and toolbar buttons. Furthermore, portlets $520_1$-$520_4$ can comprise command-line functionality.

It is to be appreciated that the system 500 can be generated in connection with an application programmer interface (API). As known, APIs facilitate building software applications via a set of routines, protocols, and tools, wherein developers and/or programmers can employ the API to construct customized applications consistent with the operating environment and a user(s) needs. Employing common APIs reduce reduces learning curves and enables developers and/or programmers to focus on business needs. In one aspect of the present invention, a GUI (e.g., via the .NET framework) can be employed in connection with the API, wherein the developer and/or programmer provides content information to generate portal 510 and portlets $520_1$-$520_4$. In another aspect of the present invention, an SDK programming package, which typically includes one ore more APIs and programming tools (including documentation), can be employed to develop applications for a platform.

It is to be appreciated that hardware such as video cards, video accelerators, rendering engines, digital signal processors (DSPs) and the like and/or displays such as CRTs, liquid crystal, flat panel, flap screen, high definition, etc. can be employed in connection with the system 500.

The system 500 can be implemented for a user(s) and/or a group(s) of users, and thus can support a typical place of business that includes a plurality of personnel (users) with various employment scopes (e.g., job descriptions, functions, etc.). However, more than one system 500 can be individually and/or concurrently employed, if desired. In order to support various combinations of users and groups of users, one or more models (e.g., configurations, settings, profiles, etc.) can be employed in connection with portal 510, wherein a respective configuration can be tailored to the user(s) and/or group(s) of users. In one aspect of the invention, a name, user identification, role, job description, seniority, security, knowledge base, project, group, team and/or responsibility, for example, can be utilized to facilitate defining a configuration, including associating the configuration with the user(s) or group(s). In another aspect of the present invention, a configuration can be based on an inference(s) such as a forecast, or prediction (e.g., via historical data) of what components and the type of access the user(s) or group(s) should be provided with for current and/or future tasks. Inferences can be statistical and/or probability based, wherein trained, dynamically adaptable and/or static systems can be utilized.

In yet another aspect of the present invention, more than one configuration can be defined for the respective user(s) and/or group(s), wherein the configuration utilized at any given instance can be manually determined and/or automatically determined, for example, based on time of day, day of the week, location, zone, building, area, region, status (e.g., security and/or errors), settings, schedule, probabilities, assigned tasks, future tasks, temporary assignments, project time lines, product lifecycle, and/or milestones. In addition, two or more configurations can be combined to dynamically provide another configuration. Thus, in many aspects of the present invention, the configuration can be based on a "who, what, where" approach, which provides finer configuration granularity over conventional network techniques that typically classify a user at a group or workgroup level.

The novel approach of customizing user(s) and group(s) configurations for portal 510 provides a flexible, efficient and simple mechanism to delineate administrative privileges to a user(s) and/or group(s). For example, an employee who is not a network administrator can be afforded network administrative privileges based on any of the above-noted criteria (e.g., employment role, location, etc.). For example, a foreman can be granted administrative privileges (e.g., a portion of the available privileges) over various components and personnel responsible to the foreman. Such privileges allow the foreman, within the scope of the delineated privileges, to generate and modify (e.g., initialize, change and narrow) configurations for the personnel responsible to the foreman, add a user or generate an account, associate/disassociate a user(s) or group(s) with a configuration, and/or delineate foreman administrative privileges, for example, to a line manager responsible for a subset of personnel under the foreman.

Moreover, the system 500 can provide the ability to combine web and application servers within a similar environment and to continue accessing components when the user is not actively utilizing system 500. For example, when system 500 is not under control of a user, it is able to contact (e.g., update, notify, etc.) a user when a predetermine criteria is met, a significant event (e.g., fatal error) occurs, human interaction is requested and/or when one user is attempting to communicate with another user, via communication schemes such as email, chat rooms, instant messaging, etc. In addition, data can continue to be collected, analyzed and employed to generate reports such as trending charts, graphs and tables, even when the system 500 is note under control of a user. The data can be stored in a location where a user can retrieve it at a later point in time.

Figure 6:
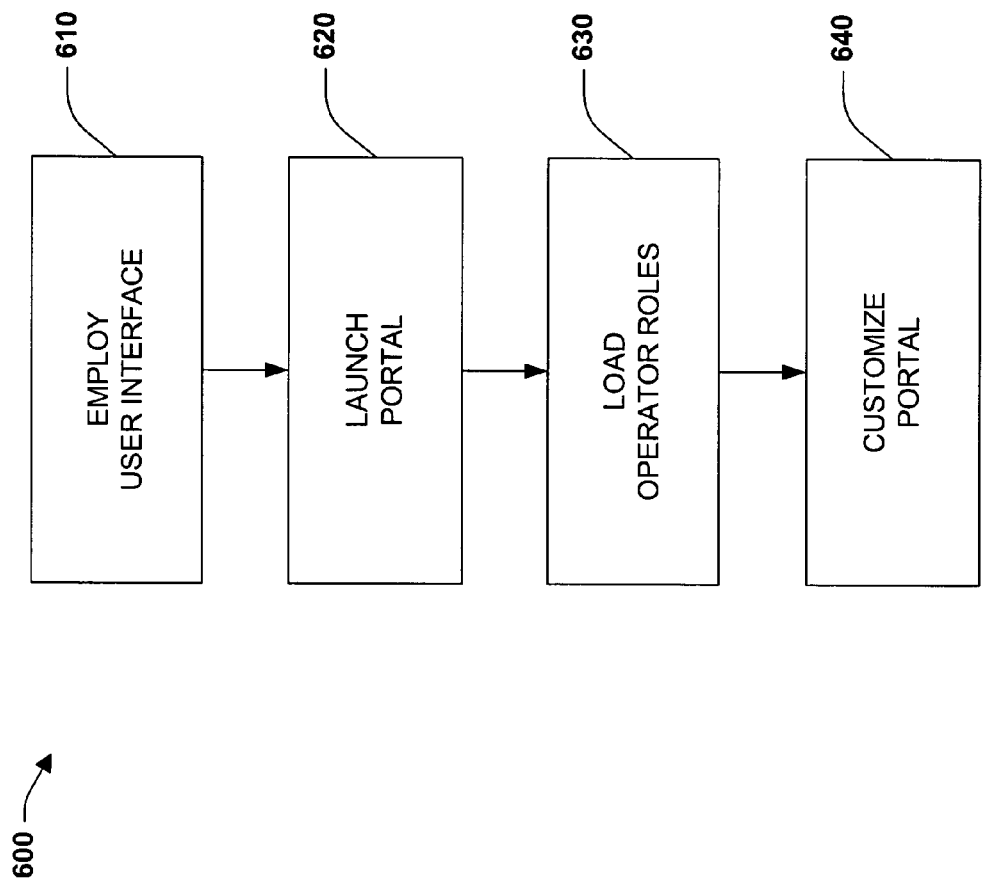
FIG. 6 illustrates an exemplary methodology for a user to utilize to load and customize a portal, in accordance with an aspect of the present invention.
Figure 7:
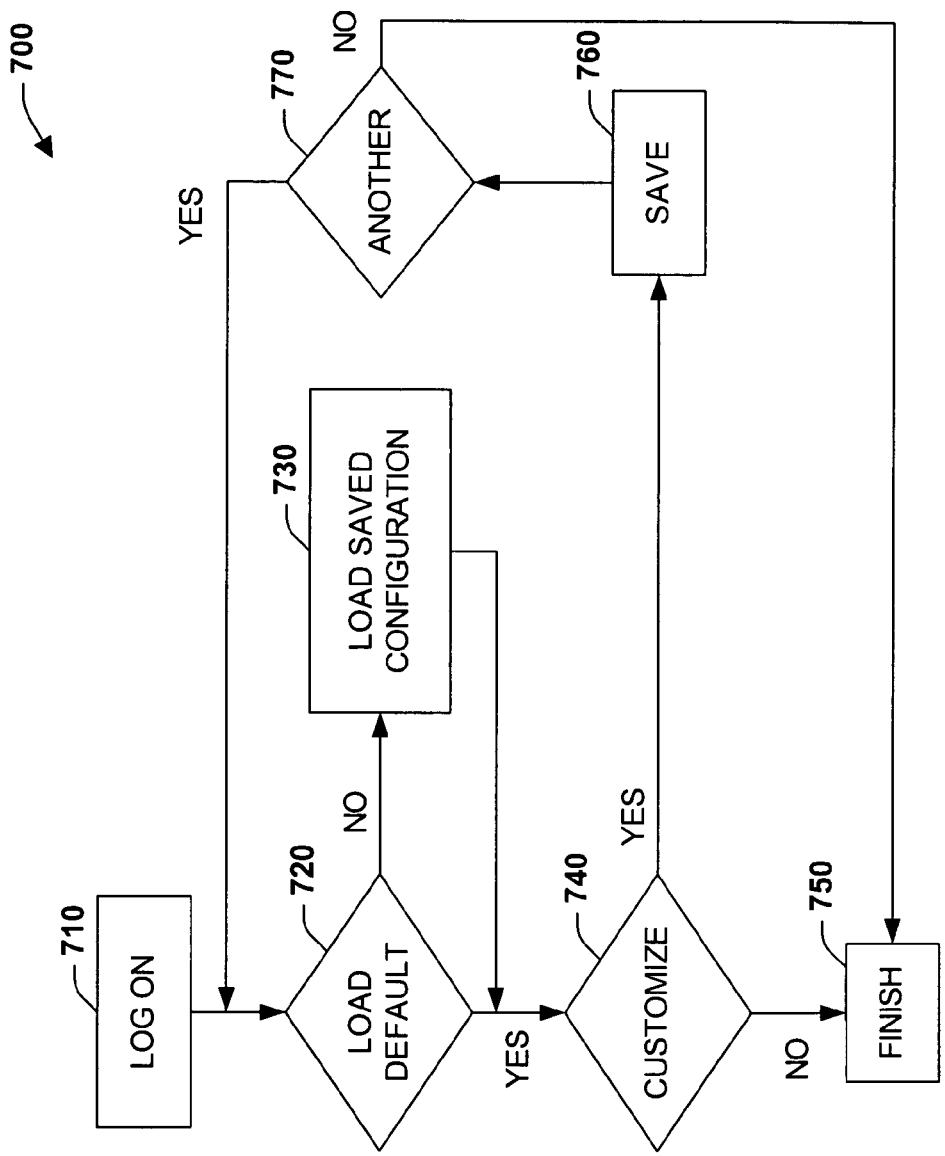
FIG. 7 illustrates an exemplary diagram depicting the flow of selecting and/or customizing portal configurations for utilization by a user, in accordance with an aspect of the present invention.

FIGS. 6 and 7 illustrate methodologies, in accordance with an aspect the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 6 illustrates a methodology 600 that can be employed to load and customize portal configurations, in accordance with an aspect of the present invention. Proceeding to reference numeral 610, an operator obtains a user interface access system, which can comprise the above-noted systems 100-500. In one aspect of the present invention, the user interface access system is retrieved from a common area such as a kiosk wherein it can be employed by a plurality of operators. For example, when an operator arrives at work or desires to view/control components, the operator can sign-out a user interface access system. When the operator no longer desires the user interface access system, such as when the operator leaves for home, the operator can return the user interface access system to the kiosk where it becomes available to another operator. In another aspect of the invention, the operator can maintain possession of the user interface access system. For example, the user interface access system can be assigned to the operator. In yet another aspect of the present invention, the operator can utilize a personal device such as a laptop.

The operator can employ the user interface access system to launch a portal at reference numeral 620 that provides an entryway to components on a network. The portal application typically is generated via an API and created based on a set of at least one criterion. In general, a common, or default portal can be launched. At 630, a hierarchy or matrix of operator information can be employed in connection with the portal to determine an operator's scope. For example, the hierarchy or matrix can be utilized to define operators, job descriptions, along with respective privileges. When an operator logs-on, the hierarchy or matrix can be utilized to set the scope for the operator. The operator's scope can include what components the operator can access, the degree of access (e.g., viewing and controlling operation) and administrative privileges, if any, provided to the operator.

At reference numeral 640, the operator can customize the portal, including adding, editing and removing portlets within the portal. For example, the operator can configure and/or override the default configuration, based on a respective scope. For example, the operator can change the color palette, arrange portlets in various manners and set the resolution. In addition, the operator can save one or more different configurations, wherein the operator can select the current configuration. Furthermore, the operator can define a default configuration that is employed when the portal is launched. The default configuration can be a particular configuration utilized whenever the operator logs on or it can be automatically selected based on criteria such as the operator's location, the time of day, the day of week, the operator's work assignment, the operator's schedule, and various other criteria. Moreover, the operator can associate a portlet with a component from a set of components available to the operator, wherein the set can be based on the operator's job position and/or project list.

FIG. 7 illustrates a methodology 700 that can be employed to load and customize portal configurations, in accordance with an aspect of the present invention. At reference numeral 710, a user logs on to a portal. While logging on, information associated with the user is utilized to determine the user's role. User information can include user name, identification, password, logon, etc. At 720, the user's role is employed to prompt the user as to whether the user desires to load a default portal configuration based on the user's role. Where more than one default configuration exists, the user can be provided with one or more of the configurations. If the user determines not to load a default configuration, then at 730 the user can provide a location to a saved configuration. It is to be appreciated that in one aspect of the present invention, the user can decide not to load a portal configuration.

At 740, after a default or saved configuration is loaded, the user can customize the configuration. For example, the user can add, remove or edit portlets. If the portal is not customized, then at 750, the portal can be employed to access components on the network. If the portal is customized, the configuration can be saved at reference numeral 760. After saving the configuration, the user can utilize it at 750 by determining not to load another configuration at 770. If the user desires to customize another configuration, then at 770 indicates the desire, and the user is prompted at 720.

It is to be appreciated that a user can indicate a desire to continue a session after logging off the portal. For example, if the user is collecting data, generating reports, creating graphs or the like, the user can continue to run in the background, after logging off or after another operator logs on. In another aspect of the present invention, the process executing to collect data and construct reports and graphs can be loaded onto another microprocessor-based component to continue after the portal has been powered down. Similar functionality can be employed when a fault occurs that soft or hard boots the portal. For example, when a fatal or non-fatal error occurs, running processes can be conveyed to another system and/or mirrored in static memory prior to the user interface access system re-starting.

Figure 8:
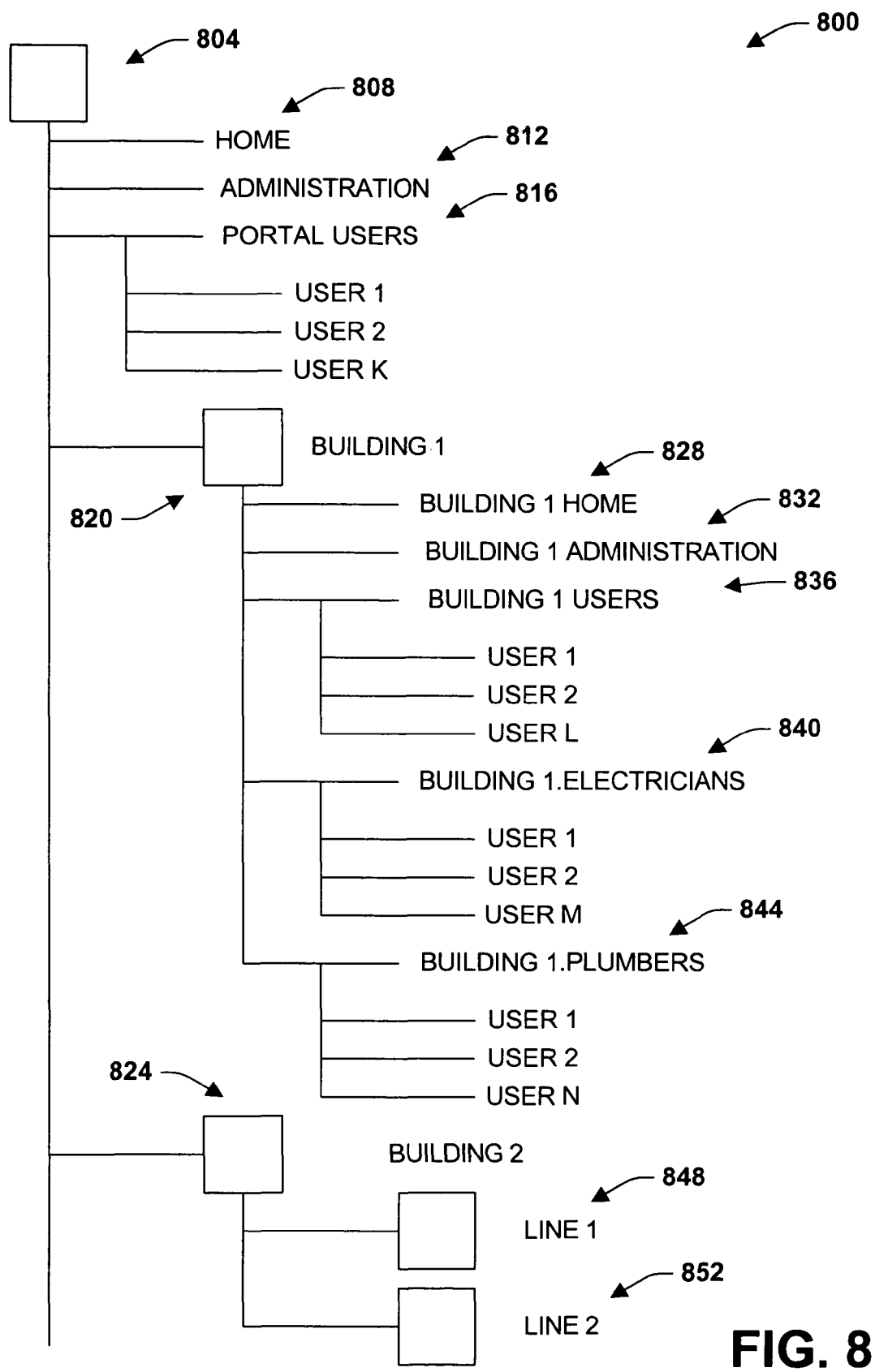
FIG. 8 illustrates an exemplary role-based, in accordance with an aspect of the present invention.

FIG. 8 illustrates an architecture 800 for defining employee roles that can be employed in connection with a portal, in accordance with an aspect of the present invention. The architecture 800 includes a base portal 804. The base portal 804 can be associated with a home configuration 808, an administrative configuration 812, a portal users 816, a building 1 configuration 820, and a building 2 configuration 824. It is to be appreciated that the particular architecture depicted as architecture 800 is provided for explanatory purposes, and is not limitative. Various other branches can be employed in connection with the portal 804, including other portal architectures.

The home configuration 808 can be a root, or high-level configuration representing an organization base, or default portal. In one aspect of the present invention, the home configuration 808 is a web page(s) or home page(s). When a user employs a portal, an instance of the home configuration 808 (web page) can be loaded in the portal. A second user can load a second instance of home configuration 808. Thus, the home configuration 808 provides a generic framework for the portal 804.

Administrative configuration 812 includes all portal 804 administrative capabilities and portal users 816 include users associated with portal 804. Administrative and/or users from 804 and 816, respectively, comprise the set of administrative privileges and personnel that can be delineated to various roles and employees within the organization. As depicted, portal users 816 comprise K users, where K is an integer greater or equal to one. All K users or a subset thereof can be associated with the administrative configuration 812. The typical business model associates the administrative configuration 812 with at least one user from users 816, and more particularly with small subset of users 816.

The building 1 configuration 820 is a sub, or nested portal. Similar to portal 804, the building 1 configuration 820 can be associated with a home (building 1) configuration 828, an administrative (building 1 administrative) configuration 832, and a users (building 1 users) configuration 836. The home configuration 828 provides users associated with building 1 a home page more tailored to the needs of users associated with the role building 1 employee. For example, whereas a user with a role associated with portal 804 can be provided with access to components in all buildings, a user with the role building 1 can be provided with access to building 1 components. The configuration developer for building 1 can focus on constructing configurations based around the components within building 1. For example, a possible default configuration for users with the role building 1 can include portlets to one or more components in building 1. 6

As noted previously, the administrative configuration 812 comprises all administrative privileges for portal 804. All or a subset of the top-level administrative privileges can be included in the building 1 administrative configuration 832. The administrative privileges provided to the building 1 administrative configuration 832 can be associated with one or more users from the set of users in the building 1 users 836, a building 1. Electricians users 840, and a building 1. Plumbers users 844. Typically, the users in the building 1 users 836 are a subset of the users 816 (L<=K), and the building 1. Electricians users 840 and building 1. Plumbers users 844 include a subset of the building 1 users 836 (M<=L and N<=L).

In one aspect of the invention, one or more users from each of the building 1 users 836, building 1. Electricians users 840 and building 1. Plumbers users 844 is associated with building 1 administration such that respective users can be provided administrative privileges over the remaining users in their respective roles. As such, the users granted administrative privileges can open and remove accounts and create and modify portal configurations within the scope of the user's role. However, it is noted that such capabilities are based on the privileges delineated to them and typically do not include full administrative privileges. For example, a plumber from building 1. Plumbers 844 can be granted administrative privileges over the remaining users with the role building 1. Plumbers. Generally, the user will not be provided with administrative privileges over building 1. electrician users. However, it can be appreciated that privileges over electricians can be granted to a plumber, if desired.

The building 2 configuration 824 is further delineated into a line 1 sub-portal 848 and a line 2 sub portal 852. It is to be appreciated the both sub-portals, line 1 848 and line 2 852, can include similar branches as described in connection with the building 1 sub-portal above. In addition, line 1 848 and line 2 822 can be further delineated into various other sub-portals.

It is to be appreciated that the particular architecture depicted as architecture 800 is provided for explanatory purposes, and is not limitative. The architecture provides a limited number of branches for sake of clarity. Various other branches can be employed in connection with the portal 804, including other portal architectures.

After generating a portal configuration utilizing architecture 800, the configuration can be loaded and utilized, and/or saved in a common storage location for later employment. When a user logs on to a portal, the logon information and/or other information (e.g., a finger print, iris map, facial characteristics or other unique identifier) can be utilized to locate the operator's role from architecture 800 in order to provide the user with access to component based on the user's role.

It is to be appreciated that the architecture 800 can be employed in an inverted manner, wherein resources and privileges are defined at the branch level. The users, privileges and home page can then be constructed from branch level information. The base portal can be constructed by aggregating branch information.

Figure 9:
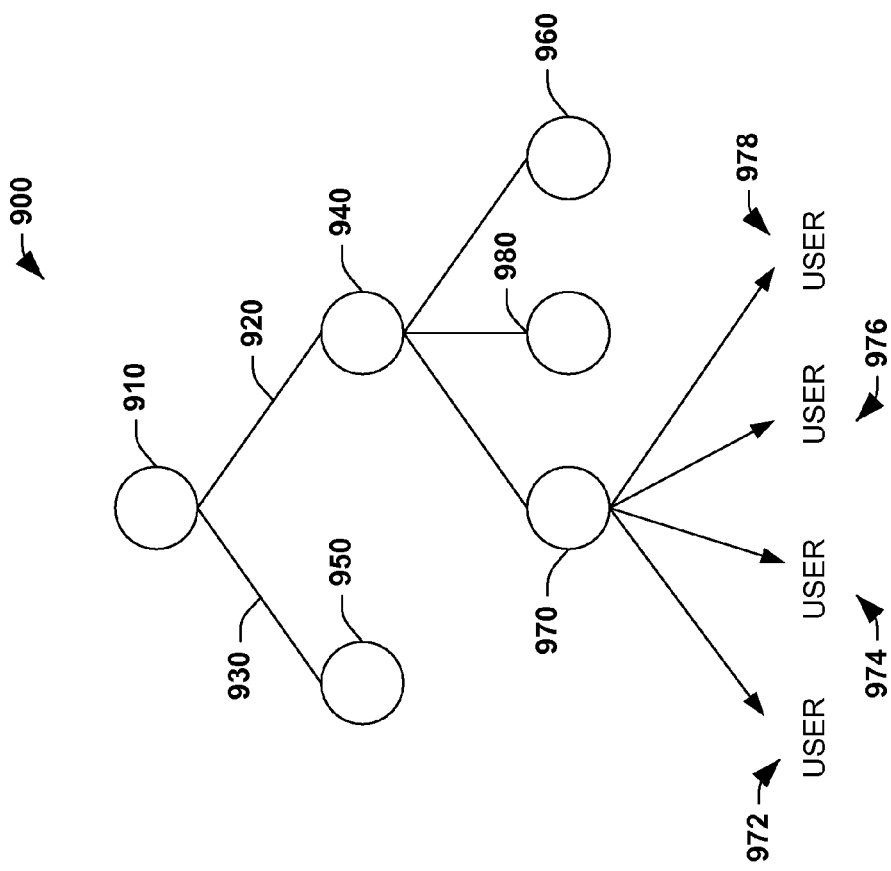
FIG. 9 illustrates a second exemplary role-based hierarchy, in accordance with an aspect of the present invention.

FIG. 9 illustrates a tree-based architecture 900. The (inverted) tree-based architecture 900 includes a root node 910 with all administrative rights and privileges. The root node 910 typically is reserved for the network administrator or the like. From the root node 910, branches 920 and 930 lead to nodes 940 and 950, respectively, on a second level. It is to be appreciated that more than two nodes can stem the root node 910, but the subject example provides for two nodes for sake of clarity of explanation. Usually, nodes (e.g., 940 and 950) on the second level are granted a subset of the root node 910 rights and privileges; however, all rights and privileges can be provided to a lower level node. The technique of branching a node into one or more lower level nodes can continue until the granularity of rights and privileges is achieved.

The rights and privileges that can be passed down a branch can include the administrative rights and privileges. For example, node 940 can be provided with administrative rights and privileges to generate and remove nodes. For example, node 940 can create and oversee node 960. In another example, node 950 is not granted administrative rights, and thus cannot generate a lower level node. It is to be appreciated that although node 950 cannot generate or remove a node, an upper level node such a node 910 can generate a node (not shown) that branches from node 950. Node 950 can be granted rights and privileges to monitor and override such a node without the rights and privileges to remove or modify the node. In addition, node 960 can be granted the ability to remove and/or modify the node even when the node is created by node 950.

Architecture 900 can be utilized to facilitate defining operator roles and corresponding component access to operators employing a portal to access the components coupled to the network. For example, the root node 910 can be utilized as a portal administrative node for a set of portal users, wherein at least one of the portal users can be associated with the portal administrative node via an administrative role designation. The remaining users from the set of users can be delineated into a subset of users for node 940 and a subset of users for node 950. It is noted that a user can reside in more than one subset of users, and thus be a user for both node 940 and 950.

Similar to root node 910, at least one of the portal users of node 940 can be deemed administrator of node 940 via an administrative role designation. The remaining users of node 940 can be delineated into subsets of users corresponding to a node 970, a node 980 and the node 960. At least one user from 960, 970 and 980 can be provided with administrative responsibilities for their corresponding node. For example, the administrator of node 970 can be granted rights and privileges over a user 972, a user 974, a user 976 and a user 978.

After generating the portal configuration from inverted tree-based architecture 900, the portal configuration can be loaded to one or more portals and/or saved in a common storage location accessible to other portables via the network. When a user logs on to the portal, the logon information and/or other information can be utilized to locate the operator's role from architecture 900 in order to provide the user with component access based on the user's role.

It is to be appreciated that a matrix architecture can employed wherein vertical, horizontal and/or diagonal associations can be formed between users and roles. For example, a user with administrative privileges over a role can provide access to components to a user with different role. In addition, administrative privileges can be delineated across roles. Such flexibility can be employed under circumstances such as the joining of roles under a project, allowing a manger from one role to temporarily manage another role, for example, during the manager's vacation, etc. Moreover, the architecture 900 can be employed in an inverted manner, wherein resources and privileges are defined at the lowest branch node. The users, privileges and home page can then be constructed from branch level information. The root portal can be constructed by accumulating branch information.

Figure 10:
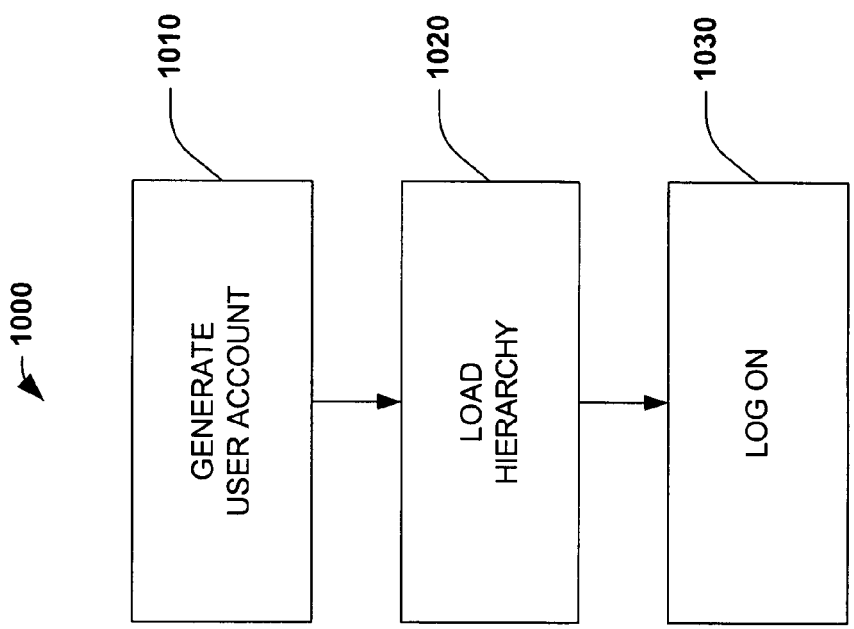
FIG. 10 illustrates an exemplary methodology to load/utilize a role-based hierarchy to provide access to networked components, in accordance with an aspect of the present invention.
Figure 11:
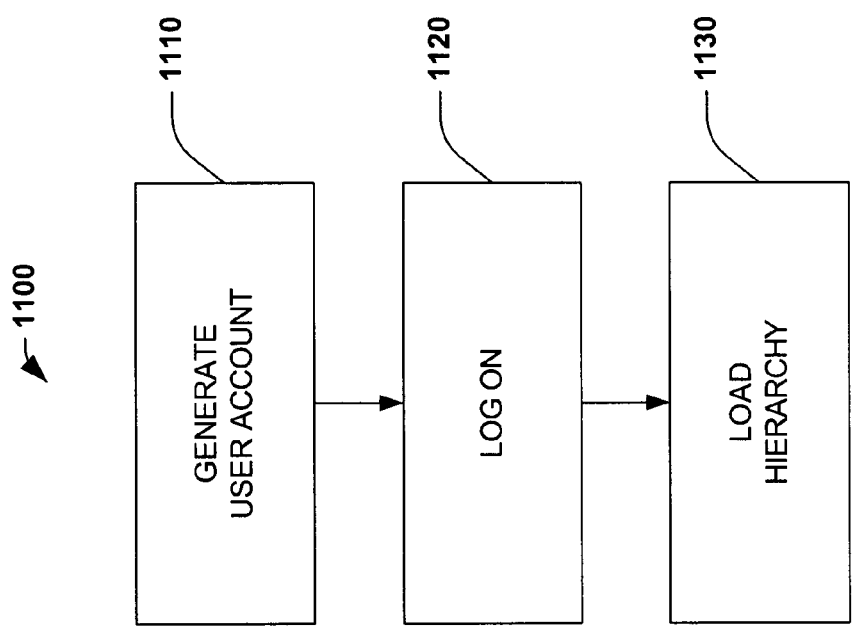
FIG. 11 illustrates a second exemplary methodology to load/utilize a role-based hierarchy to provide access to networked components, in accordance with an aspect of the present invention.

FIGS. 10 and 11 illustrate methodologies that employ a predetermined role hierarchy to provide users with selective access to components on a network, in accordance with an aspect the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 10 illustrates a methodology 1000 that employs a predetermined hierarchy (e.g., system 800 and 900) prior to a user logging on to a portal. At 1010, an account can be generated for the user. For example, a network administrator and lower-level user granted administrative privileges can setup an network account for the user. Account setup can include issuing a logon and/or password, and adding the user to a list of employees. The new user can then be added to the role hierarchy.

At 1020, the role hierarchy is loaded such that the new user can be identified within the network. At 1030, the user logs on to a portal, and the logon information and/or other information is utilized to locate the user within the hierarchy. The configuration associated with the user's role, as defined in the hierarchy, can be employed to provide the user with access to components within the scope of the user's role.

FIG. 11 illustrates a methodology 1100 that employs a predetermined hierarchy (e.g., system 800 and 900) after a user logging on to a portal. At 1110, an account can be generated for the user. For example, a network administrator and lower-level user granted administrative privileges can set up a network account for the user. Account setup can include issuing a logon and/or password, and adding the user to a list of employees. The new user can then be added to the role hierarchy.

At 1120, the user logs on to a portal and the logon information and/or other information is utilized to identify the user. At 1130, the role hierarchy is loaded and the user's identification is employed to locate the user's role. After determining the user's role, the configuration associated with the user's role, as defined in the hierarchy, can be employed to provide the user with access to components within the scope of the user's role.

As noted above, the user can modify and save various configurations, and/or utilize configurations created by other users. In addition, the user can be associated with more than one role within the hierarchy. Moreover, the hierarchy can be modified to reflect a role change (e.g., engineer to manager role shift), wherein the hierarchy is re-loaded to update the system. A reload can occur while a user is logged on, and the user can decide to allow the portal configuration to dynamically change or hold off any changes until the user desires the change, for example, the next time the user logs on.

Figure 12:
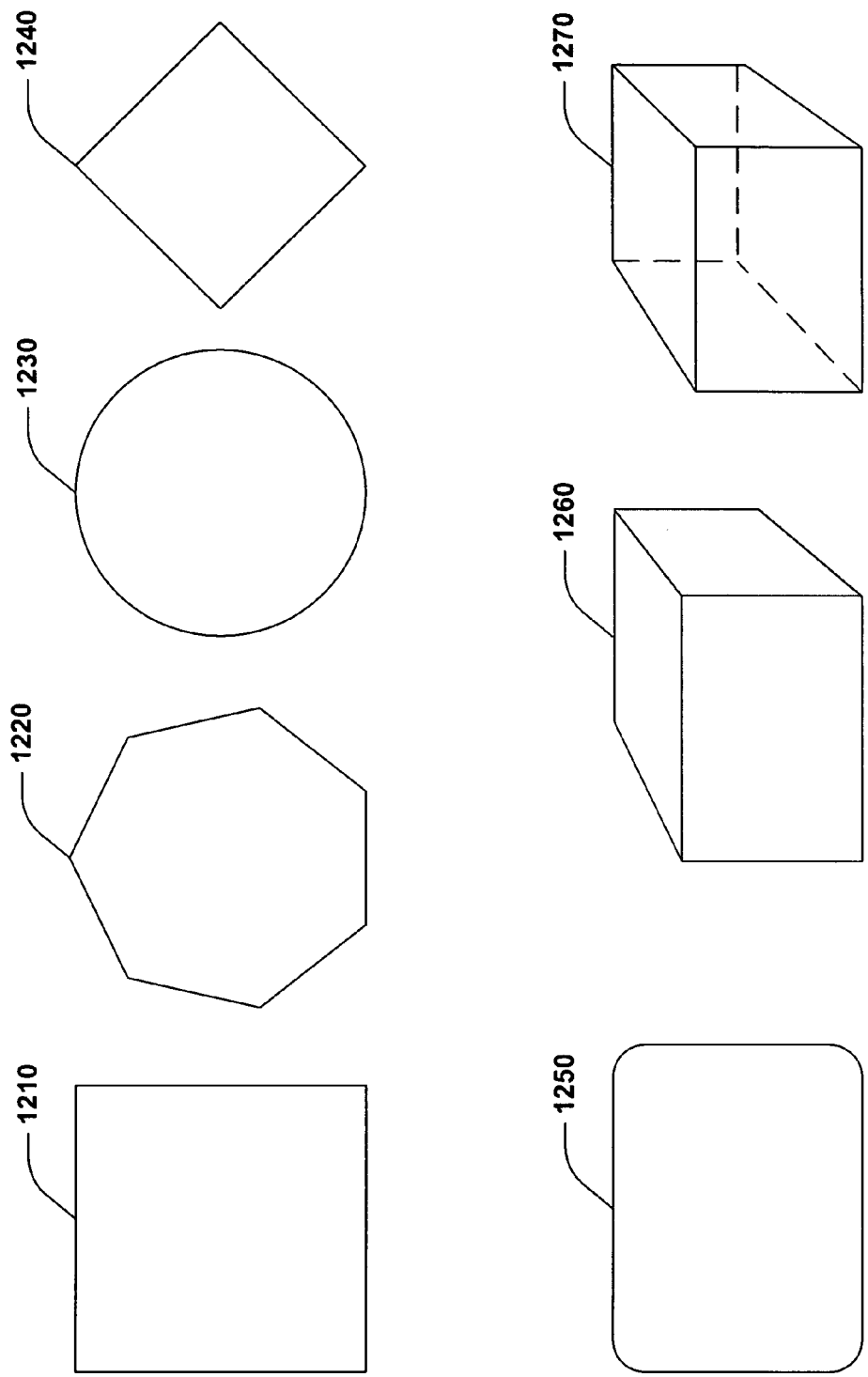
FIG. 12 illustrates an exemplary portal and/or portlet shapes, in accordance with an aspect of the present invention.

FIG. 12 illustrates various portal and/or portlet shapes that can be employed in accordance with an aspect of the present invention. The depicted shapes include a square at 1200, a heptagon at 1210, a circle at 1220, a diamond at 1230, a rectangle with rounded corners at 1240, a three dimensional rectangle at 1250 and a four dimensional rectangle at 1260. Rectangular portlet 1250 can be utilized to provide the same and/or different access on each of the portlet sides. For example, portlet 1250 can be configured such that respective sides of the portlet provide access to similar and different access. For example, two or more sides can be combined to provide a single access point with a larger, although non-planar, access area. In another example, respective sides can provide different access to the same component, wherein the operator determines how the access is delineated across sides. Rectangular portlet 1260 can be similarly employed.

Portlet 1260 can provide a fourth dimension via a variable opacity. Opacity can be adjusted such that all six sides of the portlet can be concurrently viewed. Opacity can additionally be employed with 1210-1240, wherein the opacity of a front-most portlet can be set to reveal covered portlets. It is to be appreciated that any number of overlapping portlets can be adjusted such that all or a subset of all overlapping portlets can be viewed. It is to be appreciated that the foregoing examples are provided for explanatory purposes; and virtually any shape can be utilized for a portlet.

Figure 13:
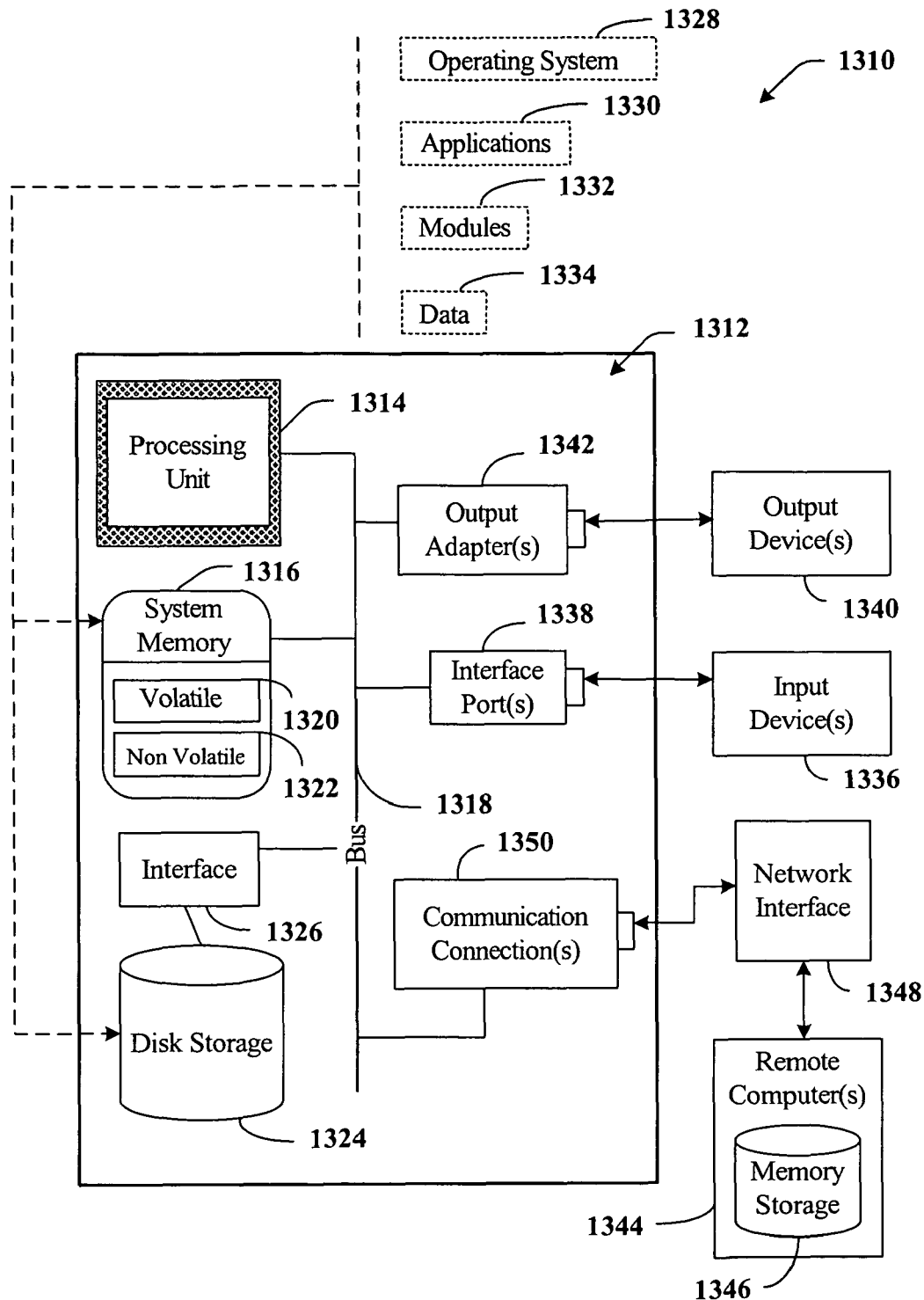
FIG. 13 illustrates an exemplary environment wherein the invention can be employed.

In order to provide a context for the various aspects of the invention, FIGS. 12 and 13 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multi-processor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
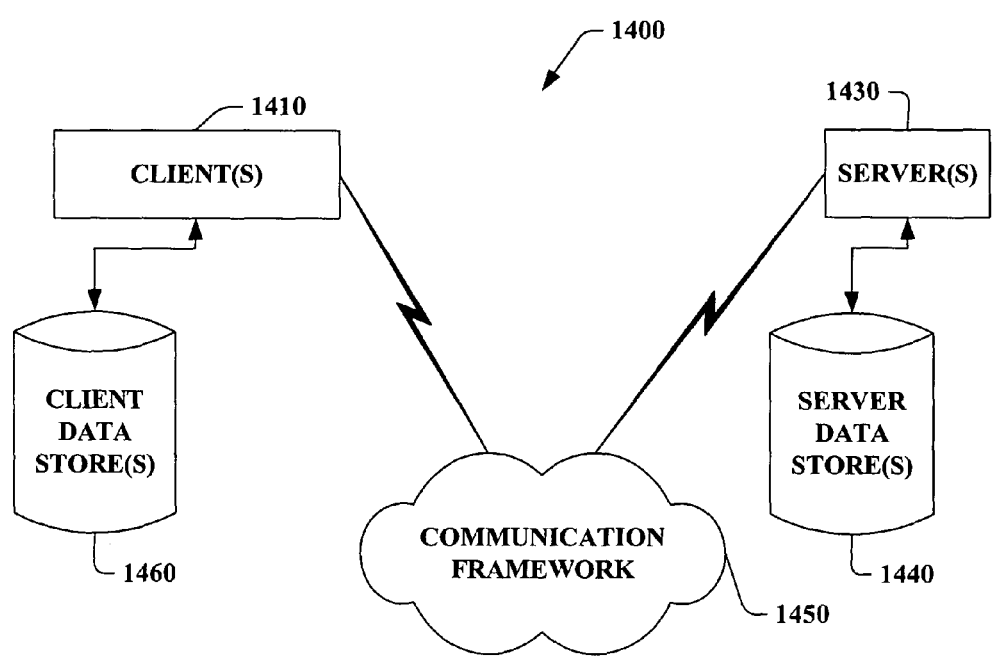
FIG. 14 illustrates a second exemplary environment wherein the invention can be employed.

FIG. 14 is a schematic block diagram of a sample-computing environment 1400 with which the present invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the present invention, for example. One possible communication between a client 1410 and a server 1430 can be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, the term "includes" is intended to be inclusive in a manner similar to the term "comprising" as "comprising" is interpreted when employed as a transitional word in a claim.

What is claimed is:

1. A system that employs a shared access profile to interact with at least one networked device, comprising:
   one or more processors;
   at least one memory communicatively coupled to the one or more processors, the memory having stored therein computer-executable instructions configured to implement the system, including:
      a storage component configured to store one or more shared access profiles respectively customized to provide access to a subset of the at least one networked device, the one or more shared access profiles associated with respective user roles and user locations;
      a role hierarchy that defines multiple locations and associated user roles, wherein the role hierarchy comprises a base portal having one or more nested location portals, and wherein the base portal and the one or more nested location portals have respective associated home configurations, administrative configurations, and user configurations;
      a retrieval component configured to access the role hierarchy to identify a login user role and a login user location associated with a login identify and to obtain a selected shared access profile associated with the login user role and the login user location from the one or more shared access profiles stored on the storage component; and
      a user interface configured to employ the selected shared access profile to provide access to a selected subset of the at least one networked device in accordance with the login user role and the login user location associated with the selected shared access profile.

2. The system of claim 1, further comprising an administrative component that allows limited administrator privileges to be delineated to selected login identities defined within the role hierarchy, the limited administrator privileges granting the selected login identities an ability to create, modify, and remove shared access profiles within a scope of a user role associated with the login identity.

3. The system of claim 1, wherein the selected shared access profile is one of a default or a customized profile.

4. The system of claim 1, wherein the one or more shared access profiles are associated with one or more attributes comprising at least one of a read attribute, a write attribute or an execute attribute.

5. The system of claim 1, further comprising an update component that provides a notification to the user interface in response to modification of selected shared access profile and refreshes the user interface in accordance with the modification upon receipt of an approval.

6. The system of claim 5, the notification comprising at least one of a text message or an audio message.

7. The system of claim 1, wherein the user interface is configured to instantiate multiple instances of the selected shared access profile, and wherein the user interface accepts input that partitions the user interface to concurrently view the multiple instances.

8. The system of claim 1, wherein multiple instances of the selected shared access profile are instantiated by a plurality of user interfaces associated with the login user role.

9. The system of claim 1, wherein the user interface is a portal comprising one or more portlets.

10. The system of claim 1, wherein the system is employed in an industrial environment.

11. A system that provides access to components on a network, comprising:
one or more processors;
at least one memory communicatively coupled to the one or more processors, the memory having stored therein computer-executable instructions configured to implement the system, including:
a role hierarchy that defines a plurality of user roles and associates access privileges and organizes the plurality of user roles according to location, wherein the role hierarchy comprises a base portal having one or more nested location portals, and wherein the base portal and the one or more nested location portals have respective associated home configurations, administrative configurations, and user configurations;
a profile bank configured to store a plurality of portal configurations that respectively define one or more network components to which access is allowed, wherein at least one of the plurality of portal configurations has a defined association with at least one of the plurality of user roles and at least one location; and
a loading component configured to access the role hierarchy upon receiving a login notification to determine a login user role and a login user location associated with the login notification, and to launch at least one selected portal configuration of the plurality of portal configurations based on the login user role and the login user location;
wherein that at least one selected portal configuration renders with a portal one or more portlets that are respectively associated with one or more network components defined by the at least one selected portal configuration, the one or more portlets providing access to the one or more network components in accordance with the portal configuration.

12. The system of claim 11, wherein multiple instances of the at least one selected portal configuration are concurrently utilized by multiple login sessions associated with the login user role and the login user location.

13. The system of claim 12, wherein at least a first of the multiple instances of the at least one selected portal configuration is dynamically refreshed in response to and in accordance with a modification to at least a second of the multiple instances of the at least one selected portal configuration.

14. The system of claim 11, further comprising a utility configured to modify the at least one selected portal configuration to yield at least one modified portal configuration, and to save the at least one modified portal configuration to the profile bank.

15. The system of claim 14, wherein the utility allows an attribute to be defined for the at least one modified portal configuration that determines whether the at least one modified portal configuration is to be accessible from the profile bank by other logins associated with the login user role.

16. The system of claim 11, wherein the at least one selected portal configuration renders a subset of network components associated with the login user role, and allows a selected component from the subset of network components to be manually associated with a portlet within the portal to allow access to the selected component.

17. The system of claim 11, wherein the loading component employs intelligence to select and load the at least one selected portal configuration, the intelligence utilizing at least one of a statistic, a probability, an inference, or a classifier to facilitate selecting the at least one selected portal configuration.

18. The system of claim 17, the intelligence comprises one or more of a Bayesian learning model, a Bayesian classifier, a decision tree learning model, a support vector machines, a linear regression, a non-linear regression, or a neural network.

19. The system of claim 11, wherein the portal is a graphical user interface comprising at least one of a web browser, a web page, or a home page.

20. A method for employing a shared portal configuration, comprising:
configuring a role hierarchy defining a plurality of locations and user roles associated with the respective plurality of locations, wherein the role hierarchy comprises a base portal having one or more nested location portals, and wherein the base portal and the one or more nested location portals have respective associated home configurations, administrative configurations, and user configurations;
storing a plurality of portal configurations defining respective one or more network components to which access is allowed;
associating at least one of the plurality of portal configurations with at least one of the user roles and at least one of the plurality of locations;
logging in under a user identity;
accessing the role hierarchy to determine a login user role and a login user locations associated with the user identity;
selecting a selected portal configuration associated with the login user role and the login user location;
loading a portal configuration according to the selected portal configuration to instantiate one or more portlets within the portal;

instantiating one or more portlets within the portal that provide access to one or more network components defined by the selected portal configuration; and employing the one or more portlets to access the one or more networked components defined by the selected portal configuration.

21. The method of claim 20, wherein the selected portal configuration is selected from a set of shared configurations that are associated with the login user role.

22. The method of claim 20, further comprising re-loading at least one instance of the portal in response to a change to the selected portal configuration.

23. The system of claim 20, further comprising employing at least one of a statistic, a probability, an inference, or a classifier to facilitate selecting the selected portal configuration.

24. The system of claim 20, further comprising:
instantiating within the portal a list of the one or more network components defined by the selected portal configuration;
receiving input via the portal that associates a selected network component from the list of the one or more network components with a selected one of the one or more portlets; and
at least one of monitoring or controlling the selected network component via the selected one of the one or more portlets.

25. A method for customizing and saving a shared portal configuration, comprising:
logging on to a portal under a user identity;
accessing a role hierarchy defining a plurality of locations and respective user roles associated with the respective plurality locations to determine a login user role and a login user location associated with the user identity, wherein the role hierarchy comprises a base portal having one or more nested location portals, and wherein the base portal and the one or more nested location portals have respective associated home configurations, administrative configurations, and user configurations;
initializing a portal configuration associated with the login user role and the login location that utilizes one or more portlets to provide selective access to networked components;
filtering a list of available networked components based on the login user role and the login user location to yield a role-specific list of networked components;
providing the role-specific list of networked components associated with the login user role and the login user location;
receiving input that associates selected networked components from the role-specific list with the one or more portlets to yield a customized portal configuration;
defining the customized portal configuration as a shared configuration to be used in connection with user identities associated with the login user role; and
saving the customized portal configuration.

26. The method of claim 25, further comprising:
associating one or more user identities with the respective one or more nested location portals.

27. The method of claim 25, further comprising customizing the portal configuration by at least one of adding, removing, or editing portlets.

28. The method of claim 25, further comprising customizing the portal configuration by defining at least one of portlet shape, size, color, rotation, location, or opacity.

29. The method of claim 25, further comprising:
retrieving the customized portal configuration in response to logging in under a different user identity associated with the login user role and the login user location; and
customizing a portal associated with the different user identity using the customized portal configuration.

30. The method of claim 25, wherein the saving the customized portal configuration comprises saving the customized portal configuration to at least one of a storage location local to the portal, a common storage location on the network, or a storage location associated with another portal.

31. The method of claim 25, further comprising employing at least one of a statistic, a probability, an inference, Bayesian learning, a Bayesian classifier, decision tree learning, a support vector machine, a linear regression, a non-linear regression, or a neural network to facilitate customization.

32. A system for employing a shared portal configuration to access components on a network, comprising:
one or more processors;
at least one memory communicatively coupled to the one or more processors, the memory having stored therein computer-executable instructions configured to implement the system, including:
means for defining a plurality of locations and respective user roles associated with the plurality of locations in a hierarchal architecture, wherein the hierarchal architecture comprises a base portal having one or more nested location portals, and wherein the base portal and the one or more nested location portals have respective associated home configurations, administrative configurations, and user configurations;
means for referencing the hierarchical architecture to determine a login user role and a login user location associated with a user identity;
means for selecting a shared portal configuration providing customized access to the components from one or more configurations associated with the login user role and the login user location;
means for invoking the shared portal configuration, the shared portal configuration instantiating portlets and respectively associating selected networked components with the portlets in accordance with the login user role and the login user location; and
means for employing the portlets to access the selected networked components, the selected networked components associated with the login user role and the login user location.

33. An application programmer interface (API) that generates a shared portal configuration in a computer readable medium, comprising:
instructions for referencing a hierarchy of locations and associated user roles to determine a login user location and a login user role associated with the user identity, wherein the hierarchy comprises a base portal having one or more nested location portals, and wherein the base portal and the one or more nested location portals have respective associated home configurations, administrative configurations, and user configurations;
instructions for instantiating a portal configuration associated with the login user location and the login user role;
instructions for filtering a list of available networked components based on the login user location and the login user role to yield a role-specific list of networked components;

instructions for receiving input to associate selected networked components from the role-specific list with selected portlets within the portal configuration;

instructions for interfacing with the selected networked components via the portlets; and instructions for saving the portal configuration as a shared configuration accessible by logging on under a different user identity associated with the login user location and the login user role.

34. The API of claim 33, further comprising instructions for delineating limited administrative privileges to selected user identities associated with the login user location and the login user role, the limited administrative privileges granting an ability to create, modify, and remove portal configurations associated with the login user location and the login user role without granting an ability to create, modify, or remove portal configurations associated with a different login user location or a different login user role.

35. The API of claim 33, further comprising instructions for associating one or more of a read, a write, or an execute attribute with the portal configuration.

36. The API of claim 33, further comprising instructions for adding, removing, and editing a portlet associated with the portal configuration.

37. The API of claim 33, further comprising instructions for defining at least one of portlet shape, size, color, rotation, location, or opacity.

* * * * *

UNITED STATES PATENT AND TRADEMARK OFFICE
CERTIFICATE OF CORRECTION

PATENT NO. : 7,895,234 B2  
APPLICATION NO. : 10/667750  
DATED : February 22, 2011  
INVENTOR(S) : David J. Lillie et al.

Page 1 of 1

It is certified that error appears in the above-identified patent and that said Letters Patent is hereby corrected as shown below:

Column 23, line 13, delete "system" and insert --method--;

Column 23, line 17, delete "system" and insert --method--.

Signed and Sealed this
Nineteenth Day of February, 2013

Teresa Stanek Rea
*Acting Director of the United States Patent and Trademark Office*